W. W. WHEELER.
ROTARY ENGINE.
APPLICATION FILED SEPT. 14, 1909.
942,476.
Patented Dec. 7, 1909.
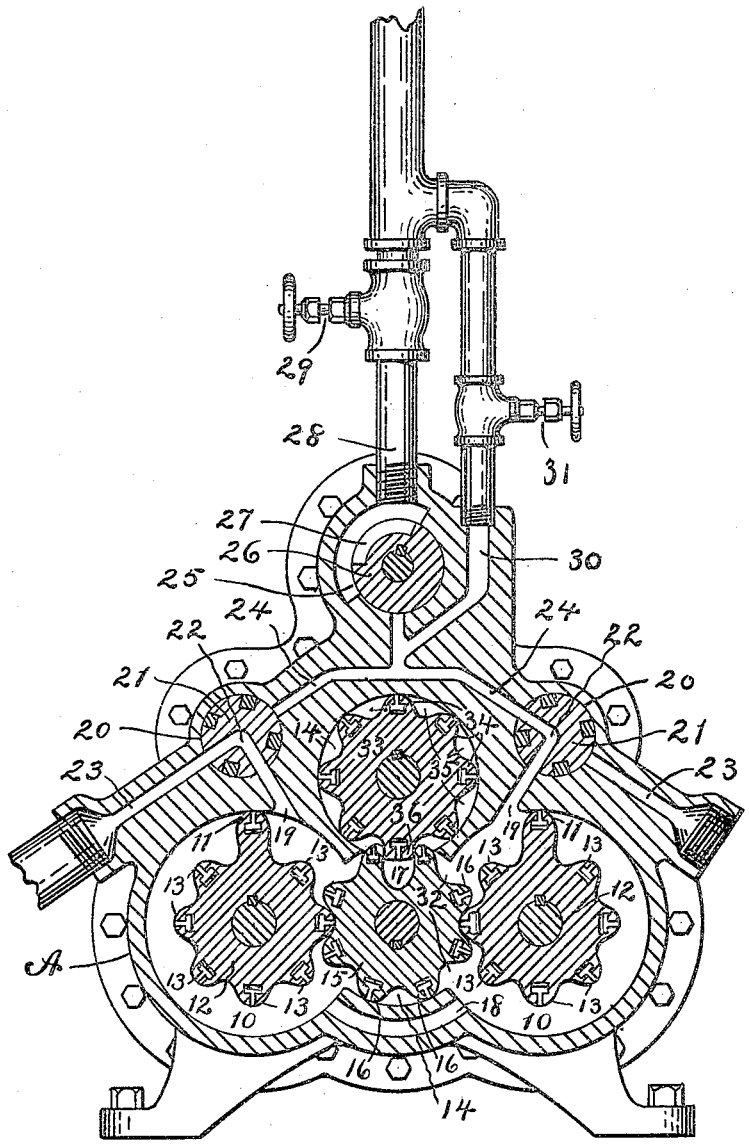
Witnesses:-
S. H. Clarke.
N. L. Lockwood
Inventor.
William W. Wheeler.
By Louis M. Schmidt.
Atty.

UNITED STATES PATENT OFFICE.

WILLIAM W. WHEELER, OF MERIDEN, CONNECTICUT.

ROTARY ENGINE.

942,476.                Specification of Letters Patent.        Patented Dec. 7, 1909.

Application filed September 14, 1909. Serial No. 517,612.

*To all whom it may concern:*

Be it known that I, WILLIAM W. WHEELER, a citizen of the United States, residing at Meriden, in the county of New Haven and State of Connecticut, have invented certain new and useful Improvements in Rotary Engines, of which the following is a specification.

My invention relates to improvements in rotary engines and the objects of my improvements are simplicity and economy in construction and convenience and efficiency in use.

In the accompanying drawing is shown a sectional view of my engine.

A is the body of my rotary engine and comprises a shell like casing provided with a set of parallel and generally cylindrical chambers in which are operatively located rotary valves, pistons and abutments in a manner to be hereinafter described. The lower main portion of said body A comprises two laterally disposed cylindrical chambers or cylinders 10 in each of which is housed a rotary piston 11 mounted on a hub 12 and adapted to rotate and in its rotation to bear against the inner periphery of the cylindrical housing 10 and constituting essentially an especially long tooth in a series of teeth of which the remainder 13 are relatively short and do not reach out to the said inner periphery. Between the said two cylinders 10 and communicating with the same is located a duplex abutment chamber 14, in the lower one of which, preferably, is located a main rotary abutment 15, comprising essentially a hub provided on the outer periphery with a series of teeth 16 adapted to mesh with the teeth 13 on the hub 12 and which has a special recess 17 adapted to permit the unimpeded travel of the relatively longer tooth or piston 11. The cylinders 10 are interconnected at their lower portions by an open port 18. Above the cylinders connect each by a port 19 to a cylindrical valve chamber 20 in which is operatively located a rotary reversing valve 21, having a right angular passage 22, by means of which in accordance with the throw of the valve 21 the said port 19 may be connected either to a discharge port 23 or a supply port or passage 24 leading to a cylindrical supply valve chamber 25 in which is located a cut off valve 26 provided with a segmental connecting chamber 27 formed by cutting away a section of the periphery and by means of which the said supply port 24 may be intermittently connected with the main fluid supply pipe 28 the flow in which is controlled by the main supply throttle valve 29. A by pass 30 around the said cut off valve 26, the flow in which is controlled by the by pass throttle valve 31, is convenient for use in starting and forcing the engine.

The construction described is in general quite ordinary and as described constitutes a reversible compound rotary engine, except that the rotary abutment would in an ordinary device be operatively mounted in a cylindrical abutment chamber, as distinct from the lower portion of a duplex chamber, and the extremities of the teeth 16 would bear in their rotation on the inner periphery of the abutment chamber. Packing strips may be provided to prevent the leakage of fluid at the ends of the rotary pistons, hubs and abutments and along the longitudinal length of the teeth in any ordinary manner. Accordingly, with the ordinary construction described, as the rotary abutment 15 revolves in the ordinary operation of the machine, live steam or fluid would be confined between the inner periphery of the abutment chamber and the abutment 15 in the spaces 32 between the teeth 16 as well as the space represented by the special recess 17, which steam or fluid would in the engine described be carried from the high pressure cylinder over to the low pressure cylinder and thence out to the exhaust, with a loss of the available kinetic and potential energy contained in the same. In order to obviate this loss I have provided in the upper part of the said duplex abutment chamber 14 an idler rotary abutment 33, provided with a series of teeth 34 which by their outer extremities bear on the inner walls of the said upper part of the said duplex chamber 14 and which teeth, with the space 35 between them, are essentially the counterparts of and adapted to operate in conjunction with the teeth 16 and the spaces 32 of the main rotary abutment 15, a special filling tooth 36 being provided to fit and fill in a similar manner generally the special recess 17, except that the said recess is only partially filled because of the abbreviation of the said filling tooth 36 in being brought down to the outer diameter of the teeth 34 so as to fit the cylindrical chamber in which it is to operate and which constitutes the said upper part of the duplex abutment chamber 14.

By the arrangement described the spaces in the rotary abutment that would otherwise be filled with live steam or operative fluid and in the ordinary method of operation would be carried away at a direct and apparently unavoidable loss are by my device filled so that there can be no such loss of steam or fluid and such loss is obviated simply by displacement or a bodily filling of the said detrimental spaces. And as described the said filling is accomplished by means of a moving element, which moves in harmony and in coöperation with the regular mechanical elements.

I have shown only one application of my device, and it is obvious that the same may be employed generally with rotary engines having internal teeth, and also with different mediums employed as a motive fluid, including explosive mixtures as well as steam.

I claim as my invention:—

1. In a rotary engine having a rotary abutment provided with teeth and spaces between the said teeth, an idler rotary abutment provided with teeth and spaces essentially the counterparts of the said teeth and spaces on said rotary abutment and adapted to coact therewith so as to fill said spaces in said rotary abutment and thereby prevent by displacement a loss in active motive fluid.

2. In a rotary engine, a rotary piston, a rotary abutment, coacting teeth on said piston and abutment, an idler rotary abutment, displacement teeth on said idler rotary abutment, said latter teeth adapted to coact with the teeth on said abutment and displace thereby live motive fluid.

3. In a rotary engine having a rotary piston and rotary abutment provided with coacting teeth, means for preventing the bodily carrying away of the active motive fluid by the said teeth on the said rotary abutment.

4. In a rotary engine having a rotary piston and a rotary abutment provided with coacting teeth and spaces between the teeth on said rotary abutment, means for preventing the carrying away of active motive fluid by the said teeth on the said rotary abutment comprising displacing such fluid by filling the said spaces.

5. In a rotary engine having a rotary piston and a rotary abutment provided with coacting teeth, and spaces between the said teeth and said abutment, means for preventing carrying away of active motive fluid confined within the said spaces comprising an idler abutment provided with teeth adapted to displace such fluid from said spaces.

6. In a rotary engine having a piston and abutment provided with coacting teeth, and spaces between the teeth on said abutment, an idler abutment provided with teeth that are essentially the counter parts of the said spaces and adapted to coact with the said teeth on said abutment.

7. In a rotary engine having a piston and abutment provided with coacting teeth, and spaces between the teeth on said abutment, an idler abutment provided with teeth, the said latter teeth adapted to coact with the said teeth on said abutment and to displace motive fluid from said spaces.

8. In a rotary engine, a cylinder provided with a piston having teeth, a duplex abutment chamber, a main abutment in one part of said chamber and provided with teeth adapted to coact with the said teeth on the said piston and having spaces between said teeth on said main abutment, an idler abutment in the other part of said duplex chamber, and provided with teeth adapted to coact with the said teeth on said main abutment, the said teeth on said idler abutment essentially the counter parts of the said spaces and adapted to fill the same so as to displace active motive fluid.

9. In a rotary engine, a cylinder provided with a piston, a duplex abutment chamber provided with a main abutment and an idler abutment, coacting teeth on said piston and main abutment, spaces between the teeth on said main abutment and teeth on said idler abutment adapted to coöperate with the teeth on said main abutment and to prevent loss of active motive fluid from said cylinder by displacement by filling said spaces.

10. In a rotary engine, a pair of cylinders separated by a duplex abutment chamber, pistons in said cylinders and a main abutment in said chamber provided with coacting teeth, spaces between the teeth on said main abutment, an idler abutment in said chamber adapted to prevent the bodily carrying over of active motive fluid from one cylinder to the other by being confined within the said spaces by means of teeth adapted to fill said spaces and thereby displace such fluid.

WILLIAM W. WHEELER.

Witnesses:
SHEFFIELD H. CLARKE,
N. L. LOCKWOOD.